G. B. CUBBERLY.
FILE.
No. 78,435. Patented June 2, 1868.
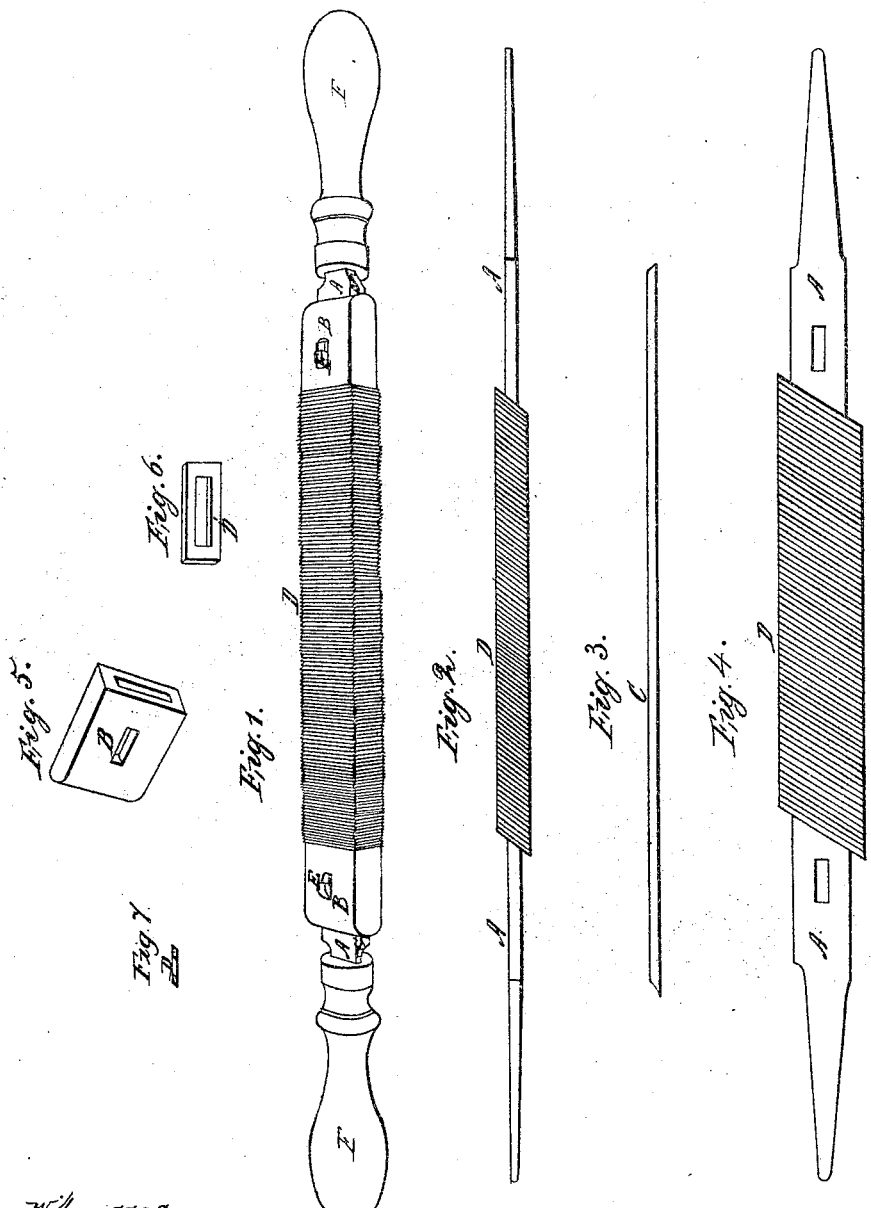
Witnesses.
Chas A Smith
B Smith
Inventor.
G B Cubberly

United States Patent Office.

G. B. CUBBERLEY, OF MILWAUKEE, WISCONSIN.

Letters Patent No. 78,485, dated June 2, 1868; antedated May 20, 1868.

IMPROVED FILE.

*The Schedule referred to in these Letters Patent and making part of the same.*

TO ALL WHOM IT MAY CONCERN:

Be it known that I, G. B. CUBBERLEY, of the city and county of Milwaukee, and State of Wisconsin, have invented a new and useful Improvement in Files; and I do hereby declare that the following is a full, clear, and exact description thereof, which will enable those skilled in the art to make and use the same, reference being had to the accompanying drawing, forming part of this specification, in which—

Figure 1 is a perspective view of the file, ready for use.
Figure 2, a view with the handles and end stops removed, and the teeth in position for grinding the sides.
Figure 3, side key.
Figure 4, a view of the file with side key removed, ready for grinding the edges.
Figure 5, one of the end stops, which hold the teeth in position.
Figure 6, one of the teeth.
Figure 7, section of tooth, showing bevel-edges of the slot in it.

Similar letters of reference in each of the figures indicate corresponding parts.

The object of my invention is to produce a file which can be sharpened by grinding on a common grindstone.

A is the stock; B, end blocks to hold the teeth in position; C, side key; D, teeth; E, keys to key up blocks B; F, handles.

Operation: To grind the teeth of the file on the sides, remove handles F and end blocks B; this will permit teeth D to tip in one direction, as shown in fig. 2. Then, with a straight piece of wood placed on the top of the teeth which will keep them even, press the bottoms of the teeth on the grindstone, and grind them as desired; then change sides. To grind the edges, remove side key C, when the teeth can be tipped or canted, as shown in fig. 4; then grind the edges in same manner as the sides.

What I claim as my invention, and desire to secure by Letters Patent, is—

Stock A, end blocks B, side key C, and teeth D, in combination, substantially as and for the purpose described.

G. B. CUBBERLEY.

Witnesses:
   CHAS. A. SMITH,
   J. B. SMITH.